United States Patent
Livingston et al.

(10) Patent No.: US 8,894,859 B2
(45) Date of Patent: Nov. 25, 2014

(54) ASYMMETRIC MEMBRANES FOR USE IN NANOFILTRATION

(75) Inventors: Andrew Guy Livingston, Knebworth (GB); Yoong Hsiang See-Toh, Wembley (GB)

(73) Assignee: Imperial Innovations Limited, London (GB)

(*) Notice: Subject to any disclaimer, the term of this patent is extended or adjusted under 35 U.S.C. 154(b) by 1321 days.

(21) Appl. No.: 12/296,515

(22) PCT Filed: Apr. 27, 2007

(86) PCT No.: PCT/GB2007/050218
§ 371 (c)(1),
(2), (4) Date: Oct. 27, 2009

(87) PCT Pub. No.: WO2007/125367
PCT Pub. Date: Nov. 8, 2007

(65) Prior Publication Data
US 2010/0038306 A1    Feb. 18, 2010

(30) Foreign Application Priority Data

Apr. 28, 2006   (GB) .................................. 0608520.3

(51) Int. Cl.
| | |
|---|---|
| B01D 61/00 | (2006.01) |
| B01D 39/00 | (2006.01) |
| B01D 39/14 | (2006.01) |
| B01D 29/00 | (2006.01) |
| B01D 61/02 | (2006.01) |
| B01D 67/00 | (2006.01) |
| C08G 73/10 | (2006.01) |
| B01D 71/64 | (2006.01) |
| B01D 71/76 | (2006.01) |

(52) U.S. Cl.
CPC .......... *B01D 61/027* (2013.01); *B01D 67/0088* (2013.01); *B01D 2323/30* (2013.01); *C08G 73/1042* (2013.01); *C08G 73/10* (2013.01); *B01D 71/64* (2013.01); *B01D 71/76* (2013.01)

USPC ........ 210/652; 210/490; 210/500.39; 264/41; 264/48

(58) Field of Classification Search
USPC ............ 210/490, 500.38, 500.39, 652; 95/45; 264/48, 41
See application file for complete search history.

(56) References Cited

U.S. PATENT DOCUMENTS

| | | | | |
|---|---|---|---|---|
| 4,107,125 | A | * | 8/1978 | Lovejoy ......................... 523/307 |
| 4,981,497 | A | * | 1/1991 | Hayes ............................... 95/51 |

(Continued)

FOREIGN PATENT DOCUMENTS

| | | |
|---|---|---|
| EP | 0 125 907 | 11/1984 |
| EP | 0 753 336 | 1/1997 |

(Continued)

OTHER PUBLICATIONS

Great Britain Search Report in connection with corresponding Great Britain Application No. GB0608520.3, dated Apr. 19, 2007.

(Continued)

*Primary Examiner* — Ana Fortuna
(74) *Attorney, Agent, or Firm* — JWIP & Patent Services, LLC; Jacob G. Weintraub, Esq.

(57) ABSTRACT

Improved integrally skinned asymmetric membranes for organic solvent nanofiltration, and their methods of preparation and use are disclosed. Membranes are formed from polyimides by phase inversion and are then crosslinked by addition of amine crosslinking agents that react with the imide groups of the polyimide, creating amide bonds. These stabilize the membranes and allow solvent nanofiltration to be maintained even in the solvents from which the membranes were formed by phase inversion.

41 Claims, 4 Drawing Sheets

(56) References Cited

U.S. PATENT DOCUMENTS

| | | | | |
|---|---|---|---|---|
| 5,067,970 | A | * | 11/1991 | Wang et al. .................. 95/51 |
| 5,174,899 | A | * | 12/1992 | Bahrmann et al. ............ 210/644 |
| 5,264,166 | A | | 11/1993 | White |
| 6,660,062 | B2 | * | 12/2003 | Liu et al. ..................... 95/45 |
| 7,556,677 | B2 | * | 7/2009 | Cranford et al. .............. 96/14 |
| 2003/0070545 | A1 | * | 4/2003 | Liu et al. ..................... 95/45 |
| 2003/0221559 | A1 | | 12/2003 | Koros et al. |
| 2004/0097766 | A1 | * | 5/2004 | Livingston ................... 568/959 |
| 2006/0249447 | A1 | * | 11/2006 | Yeager ......................... 210/506 |
| 2010/0006495 | A1 | * | 1/2010 | Buschmann ............... 210/500.25 |
| 2010/0038306 | A1 | * | 2/2010 | Livingston et al. ........... 210/496 |
| 2010/0181253 | A1 | * | 7/2010 | Vandezande et al. ......... 210/650 |

FOREIGN PATENT DOCUMENTS

| | | |
|---|---|---|
| EP | 1 038 571 | 9/2000 |
| GB | 2 274 409 | 7/1994 |
| WO | WO 00/06293 | 2/2000 |
| WO | WO 00/06526 | 2/2000 |
| WO | WO 2005/007277 A1 | 1/2005 |
| WO | WO 2006/009520 | 1/2006 |

OTHER PUBLICATIONS

International Search Report and Written Opinion in connection with corresponding PCT Application No. PCT/GB2007/050218, dated Nov. 12, 2007.

* cited by examiner

ASYMMETRIC MEMBRANES FOR USE IN NANOFILTRATION

RELATED APPLICATIONS

This application is the U.S. National Phase filing under 35 U.S.C. §371 of PCT/GB2007/050218, filed Apr. 27, 2007, which designated the United States and was published in English, which claims priority under 35 U.S.C. §119(a)-(d) to Great Britain Patent Application No. 0608520.3, filed Apr. 28, 2006. The content of these applications is incorporated herein by reference in their entireties.

FIELD OF THE INVENTION

The present invention relates to asymmetric membranes for nanofiltration, particularly nanofiltration of solutes dissolved in organic solvents.

BACKGROUND TO THE INVENTION

Membrane processes are well known in the art of separation science, and can be applied to a range of separations of species of varying molecular weights in liquid and gas phases (see for example "Membrane Technology and Applications" $2^{nd}$ Edition, R. W. Baker, John Wiley and Sons Ltd, ISBN 0-470-85445-6).

Nanofiltration is a membrane process utilising membranes whose pores are generally in the range 0.5-5 nm, and which have molecular weight cut-offs in the region of 200-2000 Daltons. Molecular weight cut-off of a membrane is generally defined as the molecular weight of a molecule that would exhibit a rejection of 90% when subjected to nanofiltration by the membrane. Nanofiltration has been widely applied to filtration of aqueous fluids, but due to a lack of suitable solvent stable membranes has not been widely applied to the separation of solutes in organic solvents. This is despite the fact that organic solvent nanofiltration (OSN) has many potential applications in manufacturing industry including solvent exchange, catalyst recovery and recycling, purifications, and concentrations.

Polyimides have been used widely to form membranes used in separation processes, particularly gas separations, and also for separations of liquids. U.S. Pat. No. 5,264,166 and U.S. Pat. No. 6,180,008 describe processes for the production of integrally skinned asymmetric polyimide membranes which are claimed to be stable in solvents such as toluene, benzene, xylene, methyl ethyl ketone (MEK) and methyl iso butyl ketone (MIBK). These membranes are prepared as flat sheet membranes on a supporting substrate using a phase inversion technique, which results in an ultra-thin top layer of the asymmetric membrane characterised by pore sizes below 5 nm in diameter. After formation, the membranes are treated with a non-volatile conditioning agent dissolved in solvent. The conditioning agent maintains membrane properties for nanofiltration of low molecular weight solutes from organic solvents, and allows the membrane to be processed, stored and handled in a dry state. These asymmetric membranes are claimed to have utility for the separation of low molecular weight organic materials with a molecular weight in the range 300-400 Daltons from solvents with molecular weight of around 100 Daltons. The application of these membranes to solvent recovery from lube oil filtrates are described in U.S. Pat. Nos. 5,360,530; 5,494,566; 5,651,877, and in the open literature in "Solvent recovery from lube oil filtrates with a polyimide membrane" White L. S., Nitsch A. R., Journal of Membrane Science 179 (2000) pages 267-274. However polyimide membranes formed in this way from phase inversion are not stable in all solvents. In particular, they are not stable in solvents in which the polyimide forming the membrane is soluble. They tend to swell or even dissolve in such solvents.

In gas separation applications, polyimides can become plasticized, thereby losing their desirable separation properties. Crosslinking of polyimides has been investigated as a means to overcome this problem in gas separation applications. U.S. Pat. No. 4,717,393 presents photo-chemical methods for the cross-linking modification of particular polyimides containing benzophenone groups and hydrogen donor groups such as methyl groups. U.S. Pat. No. 4,981,497 describes a process to modify polyimide membranes as used for the separation of gases with amino compounds including mono-, di-, tri- or polyamines. U.S. Pat. No. 4,931,182 discloses a class of polyimide membranes for gas separations containing copolymerizable, surface-modifiable units containing both aromatic diamines and alkenylated diamines having a vinyl or vinylaryl group preferably positioned ortho to an amine functionality. The polyimide units can be crosslinked by treatment with an activating force such as a high energy electromagnetic irradiation or with a free radical source to impart high selectivity to the membrane without causing a large decrease in composite permeance. U.S. Pat. No. 6,660,062 discloses a method for crosslinking a dual layer hollow fibre, where one of the layers is a polyimide, by contacting the polyimide layer with a polyamine, using a process which comprises contacting the membrane with an alcoholic solution of an aliphatic-aromatic polyamine. US Patent Application Pub. No. 2004/0177753 A1 discloses a process for treating a polyimide membrane using dendrimers or hyperbranched polymers, which may consist of multifunctional amines. International Publication WO 2006/009520 A1 discloses a process for crosslinking a polyimide by exposing it to a cross linking agent comprising one or more amine groups. U.S. Pat. No. 6,932,859 discloses the covalent crosslinking of polyimides present in hollow fibre membranes using colvalent ester crosslinks. The crosslinking of polyimide gas separation membranes has also been disclosed in the open literature, for example in; Liu et al. Journal of Membrane Science 189 (2001) 231-239 "Chemical crosslinking modification of polyimide membranes for gas separation"; Tin et al. Journal of Membrane Science 225 (2003) 77-90 "Effects of cross-linking modification on gas separation performance of Matrimid membranes"; Shao et al. Journal of Membrane Science 238 (2004) 153-163 "Transport properties of cross-linked polyimide membranes induced by different generations of diaminobutane (DAB) dendrimers"; Shao et al. Journal of Membrane Science 267 (2005) 78-89 "The effects of 1,3-cyclohexanebis(methylamine) modification on gas transport and plasticization resistance of polyimide membranes" and Wind et al. Macromolecules 36 (2003) 1882-1888 "Solid-State Covalent Cross-Linking of Polyimide Membranes for Carbon Dioxide Plasticization Reduction". In all the above prior art the membranes are either hollow fibres or dense film membranes.

SUMMARY OF THE INVENTION

The present invention provides asymmetric polyimide nanofiltration membranes which are particularly suitable for use in organic solvents. Membranes are provided in which least a fraction of the polyimide groups have been treated with a crosslinking agent and in which the membrane is impregnated with a conditioning agent.

In a first aspect, the invention provides a membrane for nanofiltration of a feed stream solution comprising a solvent and dissolved solutes and showing preferential rejection of the solutes at ambient temperature, comprising an integrally skinned asymmetric polyimide membrane, wherein at least a fraction of the imide groups of the polyimide are crosslinked and the polyimide is impregnated with a conditioning agent.

In another aspect, the invention provides a process for forming an integrally skinned asymmetric membrane for solvent nanofiltration, comprising the steps of:
(a) preparing a polyimide dope solution comprising;
  (i) a polyimide polymer, and (ii) a solvent system for said polyimide which is water miscible;
(b) casting a film of said dope solution onto a supporting substrate;
(c) after an evaporation period, immersing the film cast on the substrate into a coagulating medium;
(d) treating the resulting asymmetric membrane with a solvent comprising one or more of a mono-, di-, tri-amine and/or a polyamine; and
(e) creating the asymmetric membrane with a wash bath or baths comprising a conditioning agent.

Membranes of the invention can be used for nanofiltration operations in organic solvents. In particular, they can be used for nanofiltration operations in solvents in which the base polyimide is soluble. This is advantageous with respect to the prior art asymmetric solvent nanofiltration membranes, which lose structure and dissolve in typical dope solvents such as DMF and NMP, and exhibit low or no flux in some chlorinated solvents such as dichloromethane. Membranes of the present invention however are stable in these solvents, offering acceptable flux and rejections. Yet a further advantage of the membranes of the present invention is that they may exhibit higher fluxes than known membranes when mixtures of water and organic solvent are being processed.

DESCRIPTION OF VARIOUS EMBODIMENTS

Figure 1:
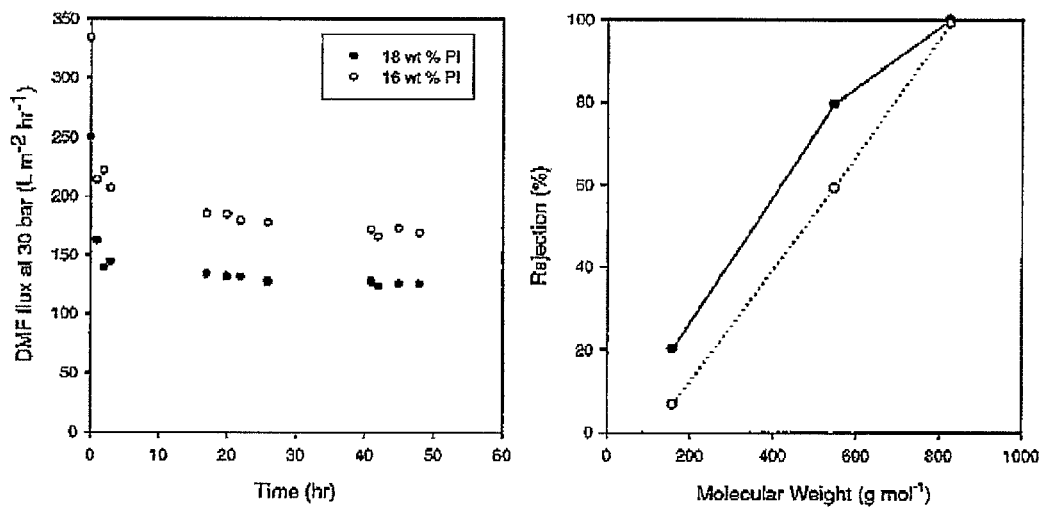
FIG. 1 shows permeate flux of DMF over time and rejection of marker compounds versus their molecular weight for crosslinked Lenzing P84 polyimide membranes operated at 30° C. and 30 bar applied pressure.

Asymmetric membranes will be familiar to one of skill in this art and include an entity composed of a dense ultra-thin top "skin" layer over a thicker porous substructure of the same material, i.e. as being integrally skinned. Typically, the asymmetric membrane is supported on a suitable porous backing or support material.

Polyimide membranes of the invention can be produced from a number of polyimide polymer sources. The identities of such polymers are presented in the prior art, including U.S. Pat. No. 4,981,497, U.S. Pat. No. 4,931,182, U.S. Pat. No. 6,660,062, U.S. Pat. No. 5,264,166, U.S. Pat. No. 6,180,008, U.S. Pat. No. 4,307,135, U.S. Pat. No. 3,708,458, U.S. Pat. No. 3,789,079, U.S. Pat. No. 3,546,175, U.S. Pat. No. 3,179,632, U.S. Pat. No. 3,179,633, U.S. Pat. No. 3,925,211, U.S. Pat. No. 4,113,628, U.S. Pat. No. 3,816,303, U.S. Pat. No. 4,240,914, U.S. Pat. No. 3,822,202, U.S. Pat. No. 3,853,754, and British Patent No. 1,434,629.

A preferred polyimide polymer useful to prepare the membranes of the invention is available as Matrimid 5218 from Huntsman Corporation. The structure is shown below. The polyimide is also known as the polymer with 1 (or 3)-(4-aminophenyl)-2,3-dihydro-1,3,3 (or 1,1,3)-trimethyl-1H-inden-5-amine and 5,5'-carbonylbis-1,3-isobenzofurandione (CAS Number 62929-02-6). A common name for Matrimid 5218 is the polymer with diaminophenylindane and benzophenone tetracarboxylic dianhydride.

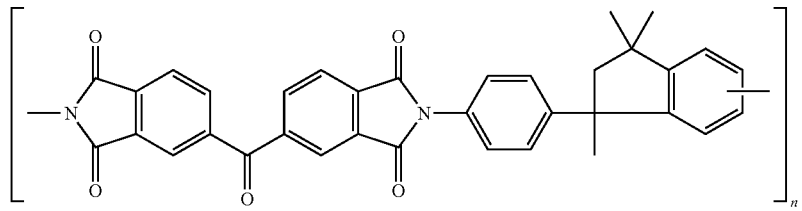

Most preferably, the membranes of the invention are prepared from a polyimide polymer described in U.S. Pat. No. 3,708,458, assigned to Upjohn. The polymer, available from HP polymers GmbH, Austria as Lenzing P84, is a copolymer derived from the co-condensation of benzophenone 3,3',4,4'-tetracarboxylic acid dianhydride (BTDA) and a mixture of di(4-aminophenyl)methane and toluene diamine or the corresponding diisocyanates, 4,4'-methylenebis(phenyl isocyanate) and toluene diisocyanate. The obtained copolyimide has imide linkages which may be represented by the structural formulae:

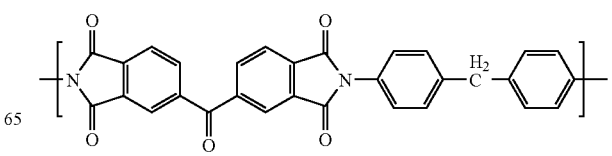

I

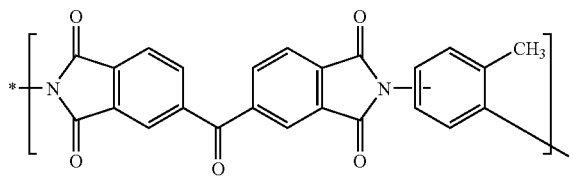

wherein the copolymer comprises from about 10 to 90% I and 90 to 10% II, preferably about 20% I and about 80% II. Another polyimide useful to prepare a membrane in accordance with the invention is a polymer, available from HP polymers GmbH, Austria as Lenzing P84 HT. The polymer is the co-condensation of 1H,3H-Benzo[1,2-c:4,5-c']difuran-1, 3,5,7-tetrone with 5,5'-carbonyl[bis1,3-isobenzofurandione], 1,3-diisocyanato-2-methylbenzene and 2,4-diisocyanato-1-methylbenzene. The structure of the polyimide is shown below.

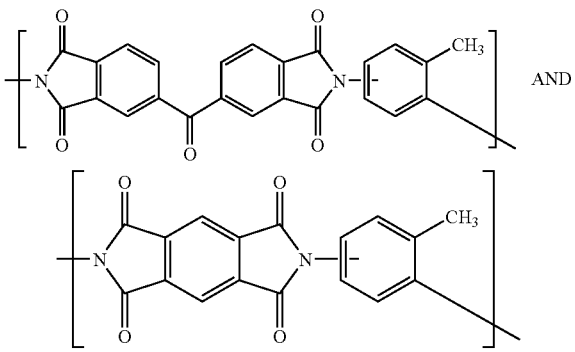

Membranes of the invention can be made by dissolving the desired polyimide polymer in a solvent together with optional viscosity enhancers, optional void suppressors, and optionally discrete particles of an immiscible matrix, to give a viscous, polymer dope solution, spreading the solution upon a porous support to form a film, partially evaporating the solvent, and quenching the film in water. This precipitates the polymer and forms an asymmetric membrane by the phase inversion process.

The invention includes a process for forming an integrally skinned asymmetric crosslinked polyimide solvent nanofiltration membrane, comprising the steps of:
(a) preparing a polyimide dope solution consisting essentially of:
  (i) a polyimide polymer present in amounts of 5 to 30% by weight of said dope solution,
  (ii) a solvent system for said polyimide which is water miscible,
  (iii) optionally, a viscosity enhancer present in amounts less than 5 wt % of said dope solution,
  (iv) optionally, a void suppressor present in amounts of less than 10% by weight of said dope solution,
  (v) optionally, a surfactant present in amounts of less than 5% by weight of said dope solution,
  (vi) optionally, a discrete inorganic or organic matrix suspended in the dope solution at an amount of less than 20% by weight of the said dope solution;
(b) casting a film of said dope solution onto a supporting substrate;
(c) after an evaporation period, immersing the film cast on the substrate into a coagulating medium;
(d) treating the resulting asymmetric membrane with a solvent containing a mono-, di-, tri- or polyamine;
(e) treating the asymmetric membrane with a wash bath or baths containing a conditioning agent.

Optionally, the membranes may be dried as a further step (f) following step (e).

The polyimide polymer dope solution may be prepared by dissolving the polyimide polymer in one or a mixture of organic solvents, including the following water-miscible solvents: N-methyl-2-pyrrolidone, hereinafter referred to as NMP, tetrahydrofuran, hereinafter referred to as THF, N,N-dimethylformamide, hereinafter referred to as DMF, dimethylsulfoxide, N,N-dimethylacetamide, 1,4 dioxane, gamma-butyrolactone, water, alcohols, ketones, and formamide.

The weight percent of the polyimide polymer in solution may range from 5% to 30% in the broadest sense, although a 16% to 28% range is preferable and an 18% to 26% range is even more preferred.

Additives such as viscosity enhancers may be present in amounts up to 10% by weight of the said polyimide polymer dope solution and these include polyvinyl pyrrolidones, polyethylene glycols and urethanes. Additionally additives such as void suppressors may be used in amounts up to 5% of the weight of said polyimide polymer dope solution, and in this case maleic acid produces the desired results. Additives such as surfactants, which influence the pore structure, may be used in amounts up to 5% of the weight of said polyimide polymer dope solution, for example Triton X-100 (available from Sigma-Aldrich UK Ltd. (octylphenoxy-polyethoxy-ethanol)).

Organic or inorganic matrices in the form of powdered solids may be present at amounts up to 20 wt % of the said polymer dope solution. Carbon molecular sieve matrices can be prepared by pyrolysis of any suitable material as described in U.S. Pat. No. 6,585,802. Zeolites as described in U.S. Pat. No. 6,755,900 may also be used as an inorganic matrix. Metal oxides, such as titanium dioxide, zinc oxide and silicon dioxide may be used, for example the materials available from Degussa AG (Germany) under their Aerosol and AdNano trademarks. Mixed metal oxides such as mixtures of cerium, zirconium, and magnesium may be used. Preferred matrices will be particles less than 1.0 micron in diameter, preferably less than 0.1 microns in diameter, and preferably less than 0.01 microns in diameter. In some cases it may be advantageous to disperse the matrices in a separate solution from the dope solution, preferably an organic solvent solution, and then subsequently add this solution to the dope solution containing the polymer. In a preferred embodiment crystals or nanoparticles of an inorganic matrix, for example zeolites or metal oxides, may be grown to a selected size in a separate solution from the dope solution, and this dispersion solution subsequently added to the dope solution containing the polymer. This separate solution may comprise water or an organic solvent with nanoparticles dispersed in the continuous liquid phase. In yet a further preferred embodiment, the solvent in which the matrix is dispersed may be volatile, and it may be removed from the dope solution prior to membrane casting by evaporation.

Once the polyimide polymer is dissolved in the solvent system described, and optionally organic or inorganic matrices are added into the dope solution so that the matrices are well dispersed, it is cast onto a suitable porous support or substrate. The support can take the form of an inert porous material which does not hinder the passage of permeate through the membrane and does not react with the membrane material, the casting solution, the gelation bath solvent, or the solvents which the membrane will be permeating in use. Typical of such inert supports are metal mesh, sintered metal, porous ceramic, sintered glass, paper, porous nondissolved plastic, and woven or non-woven material. Preferably, the support material is a non-woven polymeric material, such as a polyester, polyethylene, polypropylene, polyetherether ketone (PEEK), polyphenylene sulphide (PPS), Ethylene-ChloroTriFluoroEthylene (Halar® ECTFE), or carbon fibre material.

Following the casting operation, a portion of the solvent may be evaporated under conditions sufficient to produce a dense, ultra-thin, top "skin" layer on the polyimide membrane. Typical evaporation conditions adequate for this purpose include exposure to air for a duration of less than 100 seconds, preferably less than 30 seconds. In yet a further preferred embodiment, air is blown over the membrane surface at 15° C. to 25° C. for a duration of less than 30 seconds.

The coagulating or quenching medium may consist of water, alcohol, ketones or mixtures thereof, as well as additives such as surfactants, e.g., Triton® X-100 (available from Sigma-Aldrich UK Ltd (octylphenoxy-polyethoxyethanol)). The conditions for effecting coagulation are well known to those skilled in the art.

The asymmetric polyimide membranes formed can be washed according to the following techniques. Typically a water-soluble organic compound such as low molecular weight alcohols and ketones including but not limited to methanol, ethanol, isopropanol, acetone, methylethyl ketone or mixtures thereof and blends with water can be used for removing the residual casting solvent (e.g. DMF) from the membrane. Alternatively the membrane may be washed with water. Removal of the residual casting solvent may require successive wash blends in a sequential solvent exchange process. Both membrane efficiency (solute rejection) and permeate flow rate can be enhanced by the proper solvent exchange process.

Suitable amine crosslinking agents for treating the polyimide incorporate primary and/or secondary amines. Suitable amine agents include those reported in WO 2006/009520 A1 and U.S. Pat. No. 4,981,497. The functionality of such materials encompasses mono-, di, tri-, tetra-, and polyamines. Examples of suitable amino-compositions include ammonia, hydrazine, aliphatic amines, aliphatic-aromatic amines and aromatic amines. Specific examples of aliphatic amines include diaminobutane, diaminopentane, diaminohexane, diaminoheptane, diaminooctane, diaminononane, diaminodecane, methylamine, ethylamine, propylamine, isopropylamine, butylamine, isobutylamine, cyclohexylamine, dimethylamine, diethylamine, dipropylamine, diisopropylamine, ethylene diamine, N,N'-dimethylethylene diamine, N,N'-diethylethylenediamine, diethylenetriamine, triethylenetetramine, tetraethylene pentaamine, pentaethylenehexamine, polyethyleneimine, polyallylamine, polyvinylamine, 3-aminopropyldimethylethoxysilane, 3-aminopropyldiethoxysilane, N-methylaminopropyltrimethoxysilane, 3-aminopropyltriethoxysilane, N-methylaminopropyltrimethoxysilane, 3-aminopropyl terminated polydimethylsiloxanes, and the like. Specific examples of aliphatic aromatic amines include benzylamine, meta-xylylenediamine, para-xylylenediamine and the like. Specific examples of aromatic amines include aniline, aniline derivatives, phenylene diamines, methylene dianiline, oxydianiline and the like. The preferred amino compounds are aromatic compounds containing 2 or 3 amino groups and 6 to 30 carbon atoms, or aliphatic compounds containing 2 to 6 amino groups and 1 to 40 carbon atoms.

The crosslinking agent may be dissolved in a solvent to form a crosslinking solution. The solvent can be an organic solvent chosen from ketones, ethers, alcohols, or any solvent that dissolves the crosslinking agent. In a preferred embodiment the solvent in the crosslinking solution will also swell the asymmetric membrane to allow good penetration of the crosslinking agent into the membrane. In a preferred embodiment, the solvent is an alcohol, and in yet a further preferred embodiment the solvent is methanol or ethanol. The concentration of crosslinking agent in the crosslinking solution can be adjusted with respect to the quantity of polyimide asymmetric membrane to be added per volume of solution, in order to control the extent of crosslinking that takes place, so that the ratio between amine groups in the crosslinking solution and imide groups in the membrane treated is in the range 0.01 to 100, preferably in the range 0.01 to 10 and yet more preferably in the range 0.1 to 5.

The time for crosslinking can be varied between 0.5 and 120 hours, more preferably between 1 and 30 hours, yet more preferably between 3 and 60 hours. The temperature of the crosslinking can be varied between 0° C. and the boiling point of the solvent, preferably between 0° C. and 60° C., yet more preferably between 10° C. and 40° C.

The asymmetric membrane is then conditioned by contacting the membrane with a conditioning agent dissolved in a solvent to impregnate the membrane. The conditioning agent is a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include alcohols, ketones, aromatics, hydrocarbons, or mixtures thereof. The use of a conditioning agent in accordance with the invention allows a suitable pore structure to be maintained in a dry state, and produces a flat sheet membrane with improved flexibility and handling characteristics.

Following treatment with the conditioning agent, the membrane is typically dried in air at ambient conditions to remove residual solvent.

Heat treatment may also be used to increase the membrane rejection of solutes. After the conditioning step, the membrane may be heated to between 150° C. and 300° C. for between 1 minute and 2 hours.

Membranes of the invention can be used for nanofiltration operations, particularly in organic solvents. By the term "nanofiltration" it is meant a membrane process which will allow the passage of solvents while retarding the passage of larger solute molecules, when a pressure gradient is applied across the membrane. This may be defined in terms of membrane rejection $R_i$, a common measure known by those skilled in the art and defined as:

$$R_i = \left(1 - \frac{C_{P,i}}{C_{R,i}}\right) \times 100\% \qquad (1)$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species i if $R_i>0$. It is well understood by those skilled in the art that nanofiltration is a process in which at least one solute molecule i with a molecular weight in the range 200-2,000 g mol$^{-1}$ is retained at the surface of the membrane over at least one solvent, so that $R_i>0$. Typical applied pressures in nanofiltration range from 5 bar to 50 bar.

The term "solvent" will be well understood by the average skilled reader and includes an organic or aqueous liquid with molecular weight less than 300 Daltons. It is understood that the term solvent also includes a mixture of solvents.

By way of non-limiting example, solvents include aromatics, alkanes, ketones, glycols, chlorinated solvents, esters, ethers, amines, nitriles, aldehydes, phenols, amides, carboxylic acids, alcohols, furans, and dipolar aprotic solvents, water, and mixtures thereof.

By way of non-limiting example, specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methylpyrrolidone, acetonitrile, water, and mixtures thereof.

The term "solute" will be well understood by the average skilled reader and includes an organic molecule present in a liquid solution comprising a solvent and at least one solute molecule such that the weight fraction of the solute in the liquid is less than the weight fraction of the solvent, and where the molecular weight of the solute is at least 20 g mol$^{-1}$ higher than that of the solvent.

The membrane of the present invention can be configured in accordance with any of the designs known to those skilled in the art, such as spiral wound, plate and frame, shell and tube, and derivative designs thereof.

The following Examples illustrate the invention.

In Examples 1 to 4, a laboratory scale cross-flow nanofiltration unit was used with 4 cross flow cells. Membrane discs, of active area 14 cm$^2$, were cut out from flat sheets and placed into 4 cross flow cells in series. A feed solution consisting of <1 wt % of test solutes was charged into a 5 L feed tank and re-circulated at a flow rate of 1.5 L min$^{-1}$ using a diaphragm pump (Hydra-Cell, Wanner, USA). Pressure in the cells was generated using a backpressure regulator which was located down-stream of a pressure gauge. The pressure drop across the 4 cells was measured to be less than 0.5 bar. The re-circulating liquid was kept at 30° C. by a heat exchanger. During start-up, the conditioning agent was removed by re-circulating pure solvent for an hour without applying any pressure and discarding the initial permeate. During operation, permeate samples were collected from individual sampling ports for each cross-flow cell and the retentate sample was taken from the feed tank. Pre-conditioning of the membranes was necessary to reduce the effects of compaction to achieve steady state fluxes and rejections. Steady state was observed only after 12 hr of continuous operation. All experiments were conducted over 24 hr. The solvent flux $N_v$ was calculated from the equation:

$$N_v = \frac{V}{At} \quad (2)$$

Where V=volume of a liquid sample collected from the permeate stream from a specific cross-flow cell, t=time over which the liquid sample is collected, A=membrane area.

EXAMPLE 1

A viscous solution consisting of 16 wt % Lenzing P84 polyimide (HP polymers GmbH, Austria), 2 wt % polyvinylpyrrolidone (PVP), 60.4 wt % 1,4 dioxane and 21.6 wt % dimethylformamide (DMF) was stirred continuously at 50° C. overnight to obtain a homogeneous solution. The polymer solution was allowed to stand for a further 24 h at room temperature to remove air bubbles. Polymer films of 200 μm thickness were cast on a polyester backing material (Hollytex 3329) using an adjustable casting knife on an automatic film applicator. Solvent was allowed to evaporate from the surface of the film at controlled intervals of between 10 and 70 seconds before immersion into a precipitation water bath at room temperature. Membrane discs with a diameter of 5 cm were cut from the flat sheet. Each membrane disc was washed in water and immersed into a bath of methanol (100 ml) and 1,8 diaminooctane (amine to imide ratio 1.5 mol eqv.), taking care not to allow the membrane to dry out during handling.

After stirring the solution at 20° C. for 2 days, the membrane disc was washed in methanol to remove any residual crosslinking agent. The membrane disc was then soaked in isopropanol (IPA) for 3 hours followed by immersion in a solution of 60 v/v % light mineral oil/20% v/v IPA/20% v/v toluene. The membrane was then air-dried. Cracks were formed in membranes left to dry without the addition of the conditioning agent and these samples could not be used for filtration testing. After crosslinking, the membranes were found by immersion testing to be insoluble in DMF, 1,4 dioxane, 1-methyl-2-pyrrolidinone (NMP) and dichloromethane (DCM). The membranes were further tested for flux and rejection in the cross-flow nanofiltration unit described above using 3 marker compounds (1-decanol, tetraoctylammonium bromide and brilliant blue R) at low concentrations (1 wt %) in DMF. The results are shown in FIG. 1.

EXAMPLE 2

Crosslinked Lenzing P84 polyimide membrane was prepared as in Example 1 with the following variations; 18 wt % Lenzing P84 polyimide was used in the dope solution and an amine to imide ratio 1.5 tool eqv. of 1,8 diaminooctane was used for crosslinking. After crosslinking, the membranes were found by immersion testing to be insoluble in DMF, 1,4 dioxane, 1-methyl-2-pyrrolidinone (NMP) and dichloromethane (DCM). The membranes were further tested for flux and rejection under crossflow using 3 marker compounds (1-decanol, tetraoctylammonium bromide and brilliant blue R) at low concentrations (1 wt %) in DMF. The results are shown in FIG. 1.

The crosslinked PI membranes showed good stability in DMF and performed separations in the nanofiltration range. The membranes showed no signs of degradation after several weeks of immersion in DMF.

EXAMPLE 3

Crosslinked polyimides were prepared as per Example 2 with the following variations: the amine to imide ratio was varied by using different amounts of crosslinking agent. The results are shown in Table 1. Flux and the MWCO (molecular weight cut-off) were determined by testing the membranes in the cross flow unit with a solution of toluene containing a series of dissolved n-alkanes, each at 1 wt %. MWCO was obtained by plotting the rejection of each n-alkane species versus the molecular weight of each species. The molecular weight corresponding to a rejection of 90% was found by interpolation and is quoted in Table 1 as the MWCO.

TABLE 1

Toluene flux and MWCO of crosslinked membranes.

| Membrane | Amount of Crosslinking agent (amine to imide mol eqv.) | Flux $(Lm^{-2}hr^{-1})$ | MWCO | Solubility in DMF[a] |
|---|---|---|---|---|
| 1 | — | 224 | 510 | S |
| 2 | 0.5 | 107 | 510 | PS |
| 3 | 0.75 | 91 | 510 | IS |
| 4 | 1 | 78 | 510 | IS |
| 5 | In excess (10 wt % of crosslinking agent in solvent) | 0 | — | IS |

[a] S: soluble, PS: partially soluble, IS: insoluble

This shows that crosslinking does not affect the MWCO but does reduce flux. Advantageously, crosslinking also improves stability in DMF.

EXAMPLE 4

Crosslinked polyimide membranes were prepared as per Example 1 with the following variations: 22 wt % Lenzing P84 was used in the dope solution together with 0.1 (amine to imide) mol eqv. of crosslinking agent. The membrane was tested in a dead-end filtration cell for consecutive filtration cycles using the solvents methanol and dichloromethane in alternate cycles; tetraoctylammonium bromide (TOABr) was present as the marker compound for monitoring membrane stability, as determined by the membrane rejection of TOABr.

Figure 2:
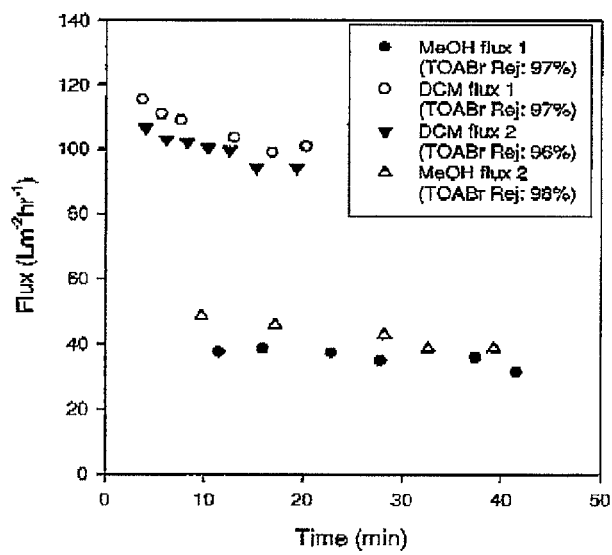
FIG. 2 shows flux and rejection data for a Lenzing P84 polyimide membrane crosslinked with 0.1 mol eqv. of crosslinking agent at 30 bar.

This data (FIG. 2) shows that the 0.1 mol equiv crosslinked polyimide membrane remained stable in DCM (i.e. no significant change in TOABr rejection) and provided both high fluxes and excellent rejection of TOABr.

EXAMPLE 5

Lenzing P84 polyimide was purchased from HP Polymer GmbH (Austria) and used without any further treatment or purification. All diamines and all other solvents were purchased from Sigma Aldrich. The diamines used in this example are as follows: 1,2-ethylenediamine (EDA), 1,3-propanediamine (PDA), 1,6-hexanediamine (HDA) and 1,8-octanediamine (ODA).

Lenzing P84 polyimide and maleic acid were dissolved in DMF and 1,4-dioxane (approximately 1:3) and stirred continuously at 50° C. overnight to obtain a homogeneous dope solution containing the polymer concentrations given in Table 2 and a maleic acid concentration of 2 wt %. The polymer dope solution was allowed to stand for a further 24 h. Membranes M0-M6 were cast on a bench top laboratory caster. The dope solution was used to cast films of 200 μm on a non-woven backing material using an adjustable casting knife on an automatic film applicator (Braive Instruments). Solvent was allowed to evaporate from the surface of the film at controlled time intervals before immersion into a precipitation water bath at room temperature. Membranes M7-M10 were cast on a continuous casting machine with the following parameters: Casting velocity: 0.5 ms$^{-1}$; Length of evaporation zone: 0.3 m; Temperature of precipitation water bath: 20-25° C.

Thereafter the membranes to be crosslinked (M1-M5 and M7-M10) were immersed into a bath of methanol and diamine for 24 h at ambient temperature. The amine to imide ratio in the bath was around 20:1 mol equivalents. The membrane was then removed from the crosslinking bath and washed with methanol to remove residual diamine. Following this, the membrane was then immersed into a bath of DMF for 24 h to check for solvent stability before finally being immersed into a bath of DMF/polyethylene glycol (PEG) 600 (20/80 v/v %) to prevent the membranes from drying out. The membranes were then air dried to remove excess solvent. Membranes allowed to dry out without the impregnation of the preservative (PEG600) curled up and cracked rendering them unsuitable for further use. A summary of the membrane preparation parameters is given in Table 2 below.

TABLE 2

Membrane preparation parameters.

| Membrane batch number | Polymer concentration[a] (wt %) | Backing material[b] | Diamine | Bench/ continuous cast |
|---|---|---|---|---|
| M0 | 22 | PE | N/A | Bench |
| M1 | 22 | PE | ODA | Bench |
| M2 | 22 | PP | ODA | Bench |
| M3 | 20 | PE | ODA | Bench |
| M4 | 18 | PE | ODA | Bench |
| M5 | 18 | PP | ODA | Bench |
| M6 | 20 | PE | N/A | Bench |
| M7 | 18 | PP | EDA | Continuous |
| M8 | 18 | PP | PDA | Continuous |
| M9 | 18 | PP | HDA | Continuous |
| M10 | 18 | PP | ODA | Continuous |

[a] Dope solution consisting of Lenzing P84 with DMF as the solvent and dioxane as the co-solvent (DMF/dioxane: ⅓)
[b] Non-woven backing material: PE = Hollytex 3329, PP = Polypropylene/polyethylene backing: Viledon FO 2471.

Initial immersion testing was carried out on non-crosslinked (M0) and crosslinked (M1 and M2) membranes to determine their stability in various polar aprotic organic solvents. Table 3 shows the physical observations of the membranes after immersion in the solvents for 72 h. It was observed that M0 readily dissolved in solvents leaving the backing un-dissolved. However, crosslinked membranes M1 and M2 showed excellent solvent stability and remained un-dissolved in the various polar aprotic solvents.

TABLE 3

Immersion test for 72 hrs for membranes in polar aprotic solvents.

| Membrane | Solvent[a] | Observation |
|---|---|---|
| M0 | NMP | Polymer dissolves leaving backing |
| M0 | DMF | Polymer dissolves leaving backing |
| M0 | DMSO | Polymer dissolves leaving backing |
| M0 | DMAc | Polymer dissolves leaving backing |
| M1 | NMP | No change |
| M1 | DMF | No change |
| M1 | DMSO | No change |
| M1 | DMAc | No change |
| M2 | NMP | No change |
| M2 | DMF | No change |
| M2 | DMSO | No change |
| M2 | DMAc | No change |

[a] NMP: N-methyl-2-pyrrolidone, DMF: N,N-dimethylformamide, DMSO: dimethylsulfoxide, DMAc: N,N-dimethylacetamide Nanofiltration experiments were carried out using both dead-end and cross-flow filtration at 30 bar and 30° C. to determine the flux and molecular weight cut off (MWCO) curves of the membranes. In both systems, membrane coupons with an active membrane area of 0.0014 m² were used. In all cases the membranes were immersed in the solvent of use for 24 h prior to testing. Dead end testing of the membranes was carried out in a SEPA ST (Osmonics, USA) dead-end nanofiltration cell. Crossflow experiments were carried out in a METcell cross flow system (Membrane Extraction Technology, UK).

A feed solution consisting of a homologous series of styrene oligomers was used to obtain the MWCO curve during nanofiltration. The styrene oligomer mixture contained a mixture of 1 g of PS580 and PS1050 (purchased from Polymer Labs, UK) and 0.1 g of α-methylstyrene dimer (purchased from Sigma Aldrich, UK). The styrene oligomers were all fully soluble in the tested solvents at this concentration except in methanol where the concentration was halved. Analysis of the styrene oligomers was carried out using a Gilson HPLC system with a Gilson 118 UV/Vis detector. Separation of the oligomers was achieved using an ACE 5-C18-300 column (Advanced Chromatography Technologies, ACT, UK). A mobile phase of 35 vol % analytical grade water and 65 vol % tetrahydrofuran (AnalaR) was used with 0.1 vol % trifluoroacetic acid. The UV detector was set at a wavelength of 264 nm.

Table 4 shows the effect of the polymer concentration on the performance of the crosslinked membranes.

TABLE 4

Effect of polymer concentration on membrane performance.

| Membrane | Polymer concentration (wt %) | Flux (Lm$^{-2}$h$^{-1}$) Water | DMF[a] | MWCO[b] |
|---|---|---|---|---|
| M2 | 22 | — | — | — |
| M3 | 20 | 65 | 17 | 250 |
| M3 | 20 | 54 | 16 | 250 |
| M4 | 18 | 126 | 27 | 420 |
| M4 | 18 | 90 | 18 | 420 |

[a]All membranes were insoluble in DMF.
[b]MWCO determined in DMF using dead end filtration at 30 bar and interpolating to the MW corresponding to 90% rejection.

Figure 3:
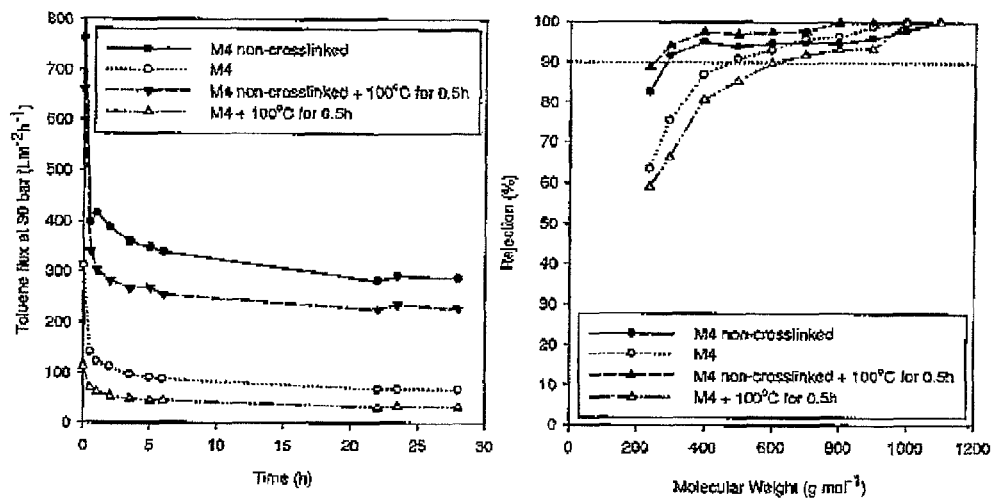
FIG. 3 shows the effect of crosslinking and thermal annealing on toluene flux and MWCO curve at 30 bar and 30° C.

FIG. 3 shows the effect of crosslinking and thermal annealing on the flux and MWCO of M4. Toluene was used to compare between the different treatment conditions as both the non-crosslinked and crosslinked membranes were stable under these conditions. In both instances, the flux of the membranes was observed to decrease with crosslinking and thermal annealing. The MWCO of the crosslinked membranes was observed to increase slightly. Whilst crosslinking has the desired effect of rendering the resultant membrane insoluble in polar aprotic solvents, this has also resulted in some loss in solvent flux of the membranes. This may be due to a reduction in polymer chain flexibility via the introduction of covalent crosslinks.

Figure 4:
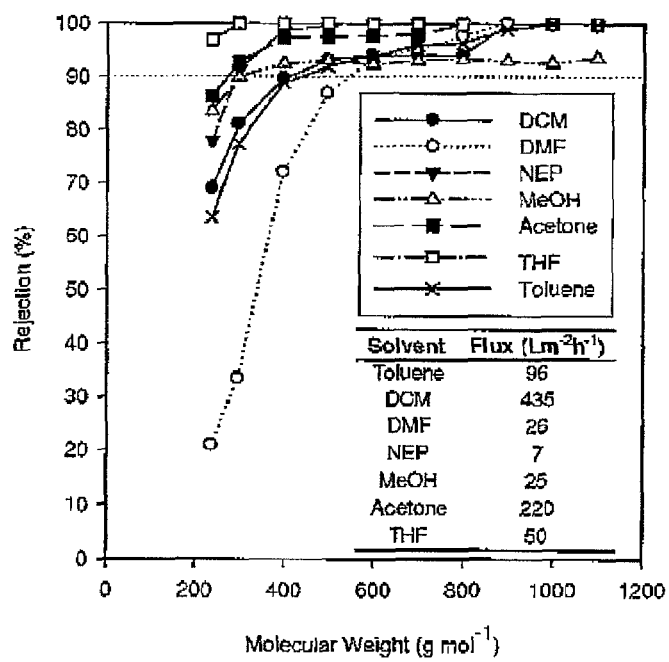
FIG. 4 shows the flux and MWCO of membrane M10 in different organic solvents tested in dead end at 30 bar.

FIG. 4 shows the flux and MWCO of the membranes in different organic solvents tested in a dead-end filtration cell. Remarkably, in addition to solvents already commonly used in OSN applications such as methanol and toluene, the membrane was also usable in solvents such as acetone, dichloromethane (DCM), DMF and 1-ethyl-2-pyrrolidone (NEP) and gave good separation within the NF range of 200-1000 g mol$^{-1}$.

Figure 5:
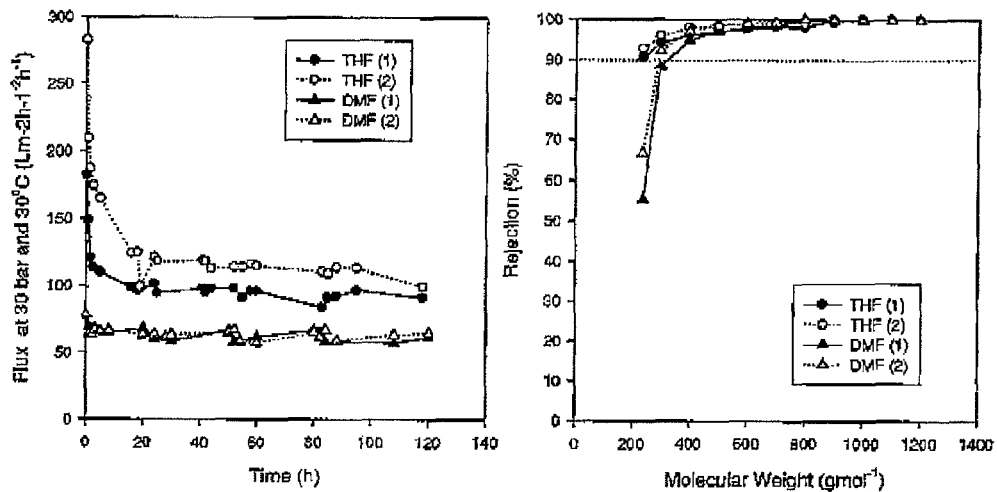
FIG. 5 shows the flux and MWCO of membrane M10 in THF and DMF.

FIG. 5 shows the flux and MWCO of the crosslinked membranes in THF and DMF at 30 bar and 30° C. Continuous testing was carried out over 120 h with flux and rejection measurements taken intermittently. Stable separating properties were observed over the test period.

Figure 6:
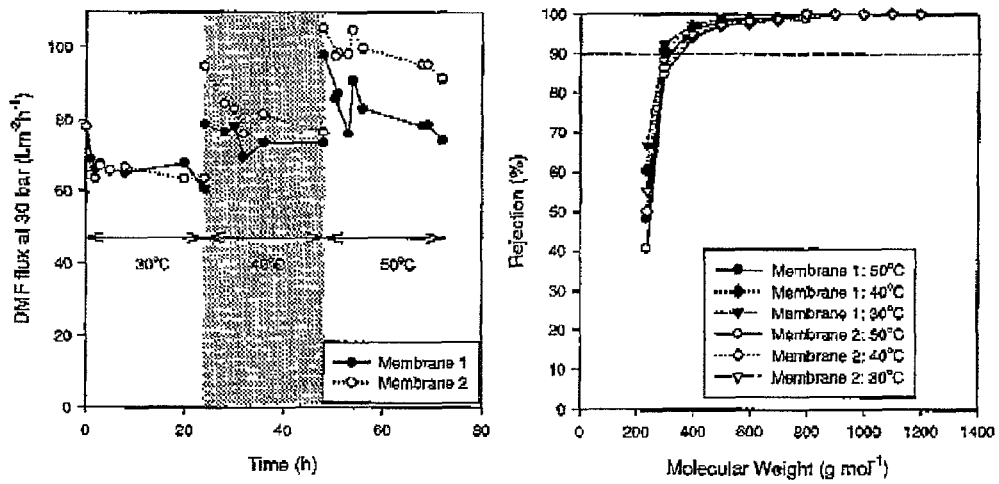
FIG. 6 shows the effect of temperature on membrane performance of membranes from batch M10 in DMF.

FIG. 6 shows the effect of operating temperature on the flux and the MWCO curve for the membranes formed in DMF as a solvent. Higher fluxes were achieved at elevated temperatures of up to 50° C. and no change in the separation performance was observed under these conditions.

Figure 7:
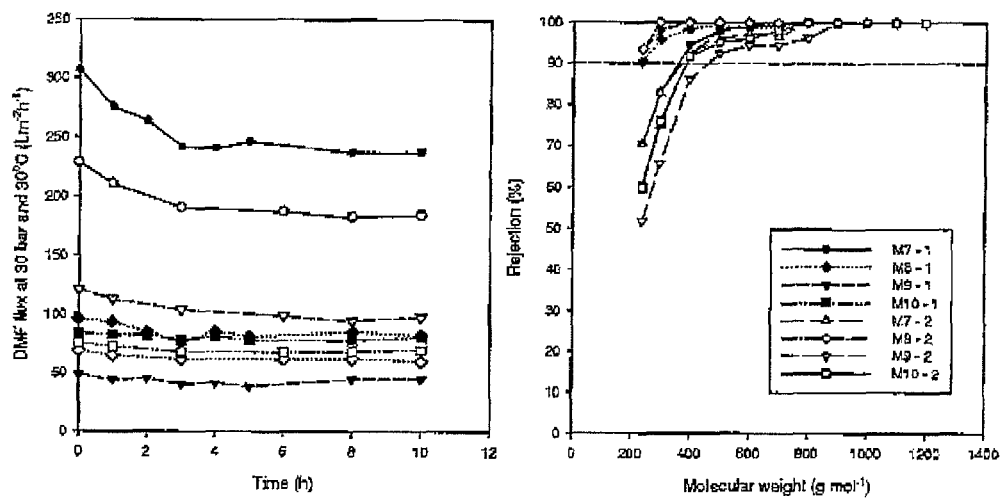
FIG. 7 shows the effect of treating membranes with different aliphatic diamines on membrane performance.

FIG. 7 shows the effect of treating the membrane with different diamines on the performance of the membranes. Of the different aliphatic diamines tested, there was little difference in terms of MWCO curves. However, treating membranes with EDA resulted in membranes with a higher flux than was obtained using the other crosslinkers.

EXAMPLE 6

Membranes were formed as described in Example 5, using either HDA or ODA dissolved in methanol, except that the conditioning agent and conditioning agent solvent were varied. White light mineral oil, Aldrich UK CAS 8042-47-5 and PEG 600 were used as conditioning agents, dissolved in DMF, acetone, and methyl ethyl ketone (MEK). The MWCO curves and fluxes of the membranes were obtained as in Example 5, using DMF as a solvent. These showed that all the membranes had a MWCO in the range 250-350 g mol$^{-1}$, and fluxes between 40 and 60 L m$^{-2}$ h$^{-1}$ at 30 bar, with no discernable difference due to conditioning agent or conditioning agent solvent.

EXAMPLE 7

A viscous solution consisting of 18 wt % Matrimid 5218 Polyimide (Huntsman Corporation, USA), 2 wt % maleic acid (MA), dissolved in a mixture of 1,4-dioxane and dimethylformamide (DMF) (approximately 3:1 by volume) was stirred continuously at 50° C. overnight to obtain a homogeneous solution. The polymer solution was allowed to stand for a further 24 h at room temperature. Polymer films of 200 µm thickness were cast on a polyester backing material (Hollytex 3329) using an adjustable casting knife on an automatic film applicator, Solvent was allowed to evaporate from the surface of the film at controlled intervals of between 10 and 70 seconds before immersion into a precipitation water bath at room temperature. Membrane sheets were washed in water and immersed into a bath of isopropanol and EDA to provide an amine to imide ratio 20:1 mol equivalent for 24 hours. The membrane was then removed and washed thoroughly with methanol to remove residual diamine. Following this, the membrane was then immersed into a bath of DMF for 24 h to check for solvent stability before discs were used to test nanofiltration performance in DMF as described in Example 5.

Figure 8:
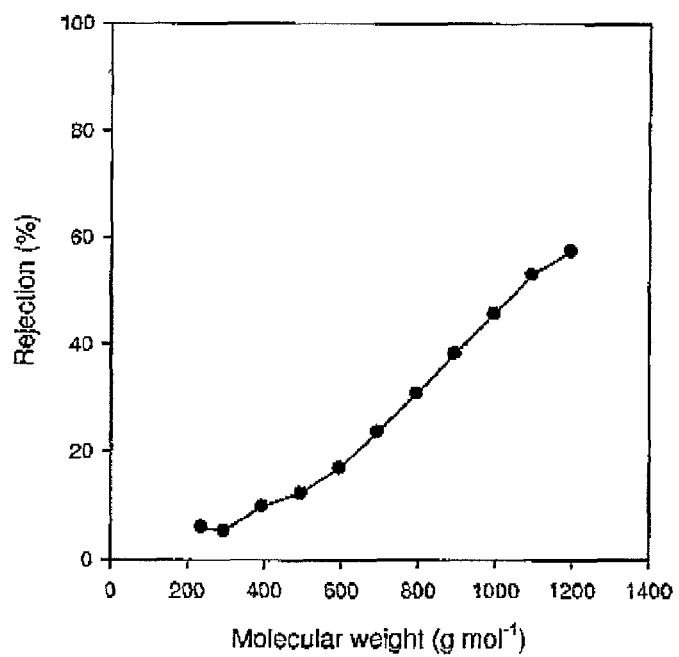
FIG. 8 shows the molecular weight cut off curve of membrane made from Matrimid 5218. Flux at 30 bar in a dead end cell test with DMF as s solvent 20 $Lm^{-2} h^{-1}$.

The resultant membranes were found to be stable in DMF and not to re-dissolve upon immersion into DMF. The membrane had a stable flux of 20 L m$^{-2}$ h$^{-1}$. FIG. 8 shows that the resulting membrane had a useful MWCO curve in the nanofiltration range when in contact with a DMF solution.

EXAMPLE 8

Membranes were prepared as in Example 5 using Lenzing P84 polyimide. The dope solution was prepared containing 16 wt % P84, Hollytex 3329 was used as the backing and the diamines were provided as a methanol solution in the amounts shown in Table 5. Octyldiamine (ODA) and p xylylenediamine (XDA) were used as cdiamines. The MWCO curves and flux were determined as described in Example 5, at 30 bar pressure and using toluene as the solvent in contact with the membrane. The results are shown in Table 5.

TABLE 5

Effect of diamines on flux of membranes

| Membrane | Crosslinker | Amount of crosslinker (mol eqv.) | Toluene flux ($Lm^{-2}h^{-1}$) | MWCO |
|---|---|---|---|---|
| M20 | — | — | 260 | 310 |
| M21 | ODA | 4.7 | 110 | 330 |
| M22 | XDA | 4.0 | 80 | 330 |

The invention claimed is:

1. A membrane, comprising an integrally skinned asymmetric polyimide membrane, wherein:
   (i) the membrane is stable in an organic solvent;
   (ii) at least a fraction of the imide groups of the polyimide are crosslinked;
   (iii) the polyimide is impregnated with a conditioning agent that functions to allow the pore structure to be maintained in a dry state and provides a flexible flat sheet membrane, said conditioning agent being either a low volatility or non-volatile organic liquid;
   (iv) the membrane preferentially rejects solutes having molecular weights in the range of 200-2000 g mol$^{-1}$ in a feed stream solution comprising an organic solvent and dissolved solutes at ambient temperature.

2. The membrane according to claim 1, wherein said membrane shows stable flux in operation under 30 bar applied pressure.

3. The membrane according to claim 1, wherein the polyimide is at least one copolymer derived from (a) the co-condensation of benzophenone 3,3',4,4'-tetracarboxylic acid dianhydride and a mixture of (i) di(4-aminophenyl)methane and toluene diamine, or (ii) a mixture of 4,4'-methylenebis (phenyl isocyanate) and toluene diisocyanate; or (b) the condensation of 1H,3H-Benzo[1,2-c:4,5-c']difuran-1,3,5,7-tetrone with 5,5'-carbonybis[1,3-isobenzofuranidione], 1,3-diisocyanato-2-methylbenzene and 2,4-diisocyanato-1-methylbenzene.

4. The membrane according to claim 1, wherein the polyimide has the following formula:

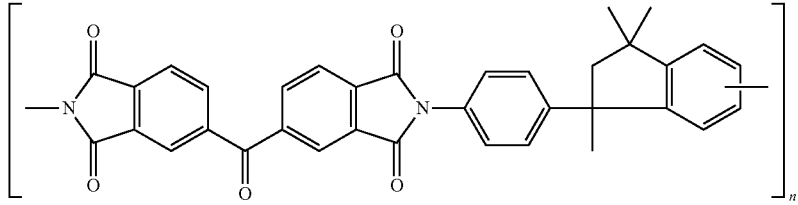

5. The membrane according to claim 1, wherein the polyimide is a polyimide copolymer comprising from 10 to 90% of:

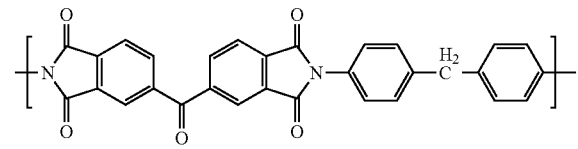

and from 90% to 10% of:

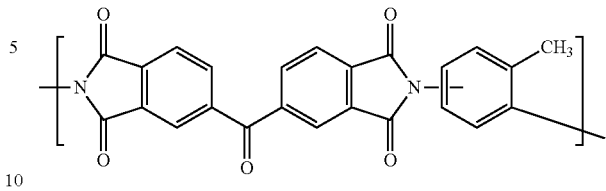

6. A membrane according to claim 1, wherein the polyimide is a polyimide copolymer comprising about 20% of:

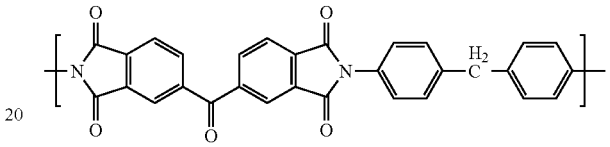

and about 80% of:

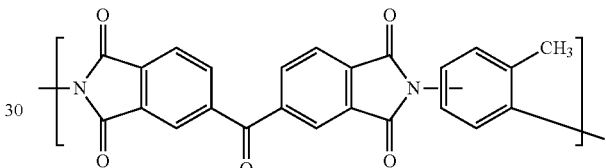

7. The membrane according to claim 1, wherein a discrete organic matrix is dispersed in the crosslinked polyimide asymmetric membrane at amounts up to 50% by weight of said membrane.

8. The membrane according to claim 7, wherein the average particle size of the discrete matrix is less than 0.1 micron.

9. The membrane according to claim 1, wherein a discrete inorganic matrix is dispersed in the crosslinked polyimide asymmetric membrane at amounts up to 50% by weight of said dope solution.

10. The membrane according to claim 1, comprising crosslinks formed from the reaction of aliphatic amines, aliphatic-aromatic amines and aromatic amines with the polyimide polymer.

11. The membrane according claim 1, wherein said membrane contains amide bonds formed from the reaction of imide groups on the polyimide polymer with any of the following aliphatic or aromatic amines: diaminobutane, diaminopentane, diaminohexane, diaminoheptane, diaminooctane, diaminononane, diaminodecane, methylamine, ethylamine, propylamine, isopropylamine, butylamine, isobutylamine, cyclohexylamine, dimethylamine, diethylamine, dipropylamine, diisopropylamine, ethylene diamine, N,N'-dimethylethylene diamine, N,N'-diethylethylenediamine, diethylenetriamine, triethylenetetraamine, tetraethylene pentaamine, pentaethylenehexamine, polyethyleneimine, polyallylamine, polyvinylamine, 3-aminopropyldimethylethoxysilane, 3-aminopropyldiethoxysilane, N-methylaminopropyltrimethoxysilane, 3-aminopropyltriethoxysilane, N-methylaminopropyltrimethoxysilane, 3-aminopropyl terminated polydimethylsiloxanes.

12. The membrane according to claim 1, wherein the conditioning agent is selected from the group consisting of one or more synthetic oils, mineral oils, vegetable fats and oils, higher alcohols, glycerols, and glycols.

13. A method for nanofiltration of a feed stream solution that comprises a solvent and dissolved solutes, comprising passing the feed stream solution through an integrally skinned asymmetric polyimide membrane as claimed in claim 1 at a temperature from ambient temperature up to 50° C., whereby the solutes are preferentially excluded and the membrane remains stable.

14. A process for forming an integrally skinned asymmetric crosslinked polyimide membrane for solvent nanofiltration, comprising:
   (a) preparing a polyimide dope solution comprising: (i) a polyimide polymer, and (ii) a solvent system for said polyimide which is water miscible;
   (b) casting a film of said dope solution onto a supporting substrate;
   (c) after an evaporation period, immersing the film cast on the substrate into a coagulating medium;
   (d) treating the resulting asymmetric membrane with a solvent comprising one or more of a mono-, di-, triamine and/or a polyamine; and
   (e) treating the asymmetric membrane with a wash bath or baths comprising a conditioning agent, said conditioning agent being a low volatility or non-volatile organic liquid.

15. A process according to claim 14, wherein the polyimide polymer is present in amounts of 10 to 30% by weight of said dope solution.

16. The process according to claim 14, wherein the polyamine is a mono-, di-, or tri-polyamine.

17. The process according to claim 14, further comprising (f) drying the membrane.

18. The process according to claim 14, further comprising heating the membrane to at least about 150° C.

19. The process according to claim 14, wherein the polyimide has the following formula:

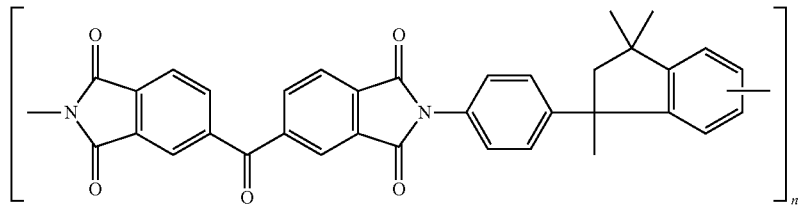

20. The process according to claim 14, wherein the polyimide is a polyimide copolymer comprising from 10 to 90% of:

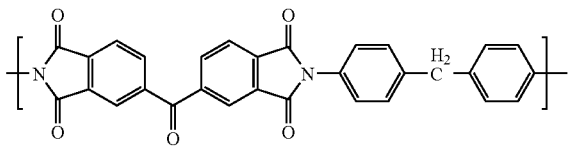

and from 90% to 10% of:

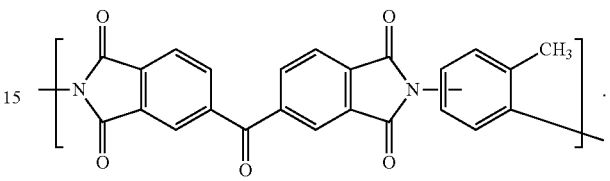

21. The process according to claim 14, wherein the polyimide is a polyimide copolymer comprising about 20% of:

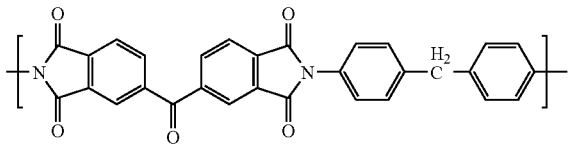

and about 80% of:

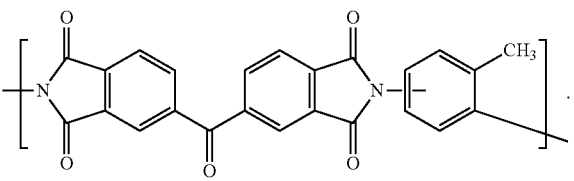

22. The process according to claim 14, wherein the polyimide dope solution comprises a solvent selected from the group consisting of N-methyl-2-pyrrolidone, tetrahydrofuran, N,N-dimethylformamide, dimethylsulfoxide, N,N-dimethylacetamide, 1,4 dioxane, gamma-butyrolactone, water, alcohols, ketones, and formamide.

23. The process according to claim 14, wherein the polyimide dope solution further comprises a viscosity enhancer in amounts of up to 10% by weight of said dope solution.

24. The process according to claim 14, wherein the polyimide dope solution further comprises a viscosity enhancer selected from the group consisting of polyvinyl pyrrolidones, polyethylene glycols and in amounts up to 10% by weight of said dope solution.

25. The process according to claim 14, wherein the polyimide dope solution further comprises a void suppressor used in amounts up to 5% of the weight of said polyimide dope solution.

26. The process according to claim 14, wherein the polyimide dope solution further comprises a discrete organic matrix dispersed therein at amounts up to 20% by weight thereof.

27. The process according to claim 26, wherein the average particle size of the discrete matrix is less than 0.1 micron.

28. The process according to claim 26, wherein the discrete matrix is first dispersed in a solvent and subsequently added to the dope solution.

29. The process according to claim 28, wherein the solvent used to disperse the discrete matrix is removed from the polyimide dope solution by evaporation.

30. The process according to claim 14, wherein the polyimide dope solution further comprises a discrete inorganic matrix dispersed therein at amounts up to 20% by thereof.

31. The process according to claim 14, wherein the amine crosslinking agent is selected from the group consisting of ammonia, hydrazine, aliphatic amines, aliphatic-aromatic amines and aromatic amines.

32. The process according to claim 14, wherein the amine crosslinking agent is selected from the group consisting of diaminobutane, diaminopentane, diaminohexane, diaminoheptane, diaminooctane, diaminononane, diaminodecane, methylamine, ethylamine, propylamine, isopropylamine, butylamine, isobutylamine, cyclohexylamine, dimethylamine, diethylamine, dipropylamine, diisopropylamine, ethylene diamine, N,N'-dimethylethylene diamine, N,N'-diethylethylenediamine, diethylenetriamine, triethylenetetraamine, tetraethylene pentaamine, pentaethylenehexamine, polyethyleneimine, polyvinylamine, 3-aminopropyldimethylethoxysilane, 3-aminopropyldiethoxysilane, N-methylaminopropyltrimethoxysilane, 3-aminopropyltriethoxysilane, N-methylaminopropyltrimethoxysilane and 3-aminopropyl terminated polydimethylsiloxanes.

33. The process according to claim 14, wherein the amine crosslinking agent is dissolved in a solvent.

34. The process according to claim 14, wherein the amine crosslinking agent is dissolved in a solvent selected from the group consisting of ketones, ethers and alcohols.

35. The process according to claim 14, wherein the quantity of amine crosslinking agent used to treat the polyimide membrane is adjusted so that the amine to imide mole ratio is in the range of 0.01 to 10.

36. The process according to claim 14, wherein the quantity of amine crosslinking agent used to treat the polyimide membrane is adjusted so that the amine to imide mole ratio is in the range of 0.1 to 5.

37. The process according to claim 14, wherein the time for crosslinking is between 0.5 and 120 hours.

38. The process according to claim 14, wherein the time for crosslinking is between 3 and 60 hours.

39. The process according to claim 14, wherein the temperature of the crosslinking solution is held between 0 and 60° C.

40. The process according to claim 14, wherein the conditioning agent is selected from the group consisting of one or more synthetic oils, mineral oils, vegetable fats and oils, higher alcohols, glycerols, and glycols.

41. The process according to claim 14, wherein the resulting membrane is configured as spiral wound, plate and frame, shell and tube, or a derivative design thereof.

* * * * *